(No Model.)
E. DODGE.
LUMBER TRUCK.
No. 494,523. Patented Mar. 28, 1893.
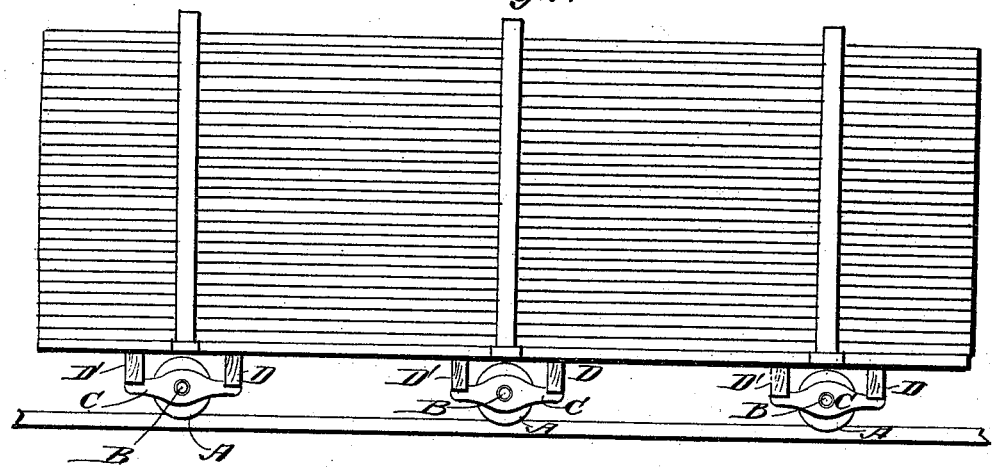
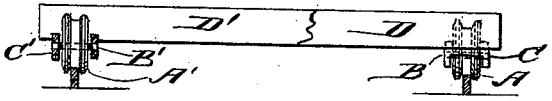
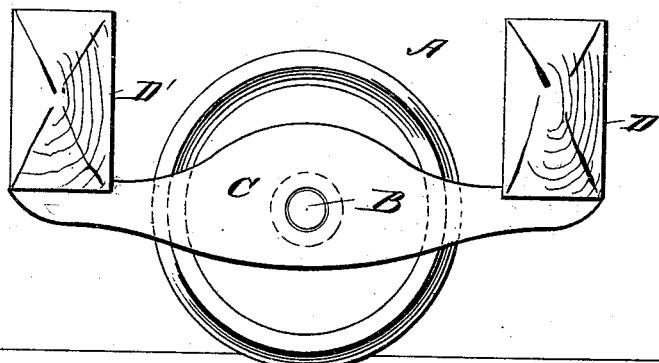
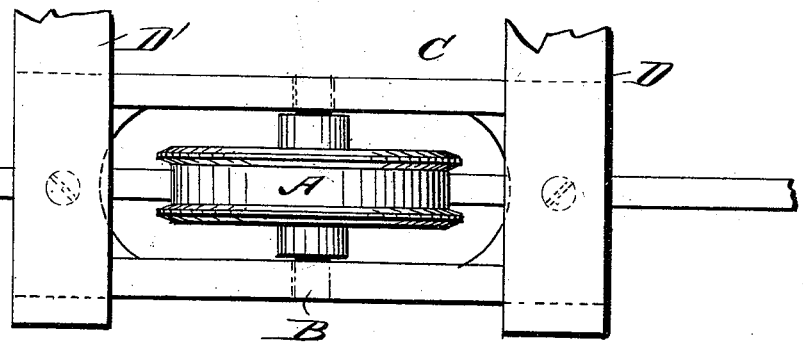
WITNESSES:
INVENTOR
Edward Dodge
BY
Munn & Co
ATTORNEYS.

UNITED STATES PATENT OFFICE.

EDWARD DODGE, OF LONGVIEW, TEXAS.

LUMBER-TRUCK.

SPECIFICATION forming part of Letters Patent No. 494,523, dated March 28, 1893.

Application filed August 27, 1892. Serial No. 444,279. (No model.)

*To all whom it may concern:*

Be it known that I, EDWARD DODGE, of Longview, in the county of Gregg and State of Texas, have invented a new and Improved Lumber-Truck, of which the following is a full, clear, and exact description.

The object of the invention is to provide a new and improved lumber truck, which is simple and durable in construction, and arranged to conveniently load and carry lumber to and from kilns and other places.

The invention consists of a pair of double flanged wheels journaled in independent frames connected with each other by cross bars forming a skid for the lumber to be carried.

The invention also consists of certain parts and details, and combinations of the same, as will be fully described hereinafter and then pointed out in the claims.

Reference is to be had to the accompanying drawings forming a part of this specification, in which similar letters of reference indicate corresponding parts in all the figures.

Figure 1 is a side elevation of the improvement as applied. Fig. 2 is an end view of the same with parts in section; and Fig. 3 is an enlarged side elevation of one of the trucks; and Fig. 4 is a plan view of part of the same.

As illustrated in Fig. 1, several of the lumber trucks are employed to carry a load of lumber. Each of these individual lumber trucks is provided with a set or pair of double flanged wheels A, A', having axles B, B', respectively, journaled in frames C, C', respectively, each frame being formed with two side pieces connected with each other at their ends, as plainly shown in Figs. 3 and 4, the frame, however, being preferably cast in one piece, but it may be made of several pieces, if desired.

The two frames C and C' are connected with each other by cross beams D, D', supported on the ends of the frames and preferably projecting suitable distances beyond the said frames on each side, as will be readily understood by reference to Fig. 2. The top surfaces of the beams D and D' extend above the tops of the wheels A, A', and the said cross beams form skids for supporting the lumber to be carried.

Now, when it is desired to use the lumber trucks for carrying a load of lumber over tracks to the kiln or other place, then a number of such trucks are placed suitable distances apart, according to the length of the lumber to be carried. The lumber is placed longitudinally on the several trucks, the bottom boards resting on the cross beams D, D', as will be readily understood by reference to Fig. 1. When the desired amount of lumber has been piled up, it is bound by chains or posts, or other means. Now, it will be seen that the lumber is supported on each truck at two places, that is, at the cross beams D, D' of each truck frame, and consequently the pressure is equally distributed on the axles of the wheels.

A lumber truck constructed in this manner can be very cheaply manufactured, is very strong, and is adapted to carry a heavy load.

Having thus fully described my invention, I claim as new and desire to secure by Letters Patent—

1. A lumber truck, comprising a pair of double flanged wheels, the axes of which are in longitudinal alignment a frame for each wheel, and cross beams for connecting the frames with each other, at opposite sides of and parallel with the axes of said wheels substantially as shown and described.

2. A lumber truck, consisting in a single grooved wheel for each track, a frame C for each wheel, comprising two parallel bars between which the said wheels are journaled, and a pair of cross beams D D' resting at their ends on the ends of the two frames C, substantially as set forth.

EDWARD DODGE.

Witnesses:
T. B. BROWN,
W. E. DICKOUT.